Sept. 20, 1949.  E. A. JOHNSON  2,482,187
PROCESS FOR PRODUCING HYDROGEN-CARBON
MONOXIDE GAS MIXTURES
Filed April 3, 1944
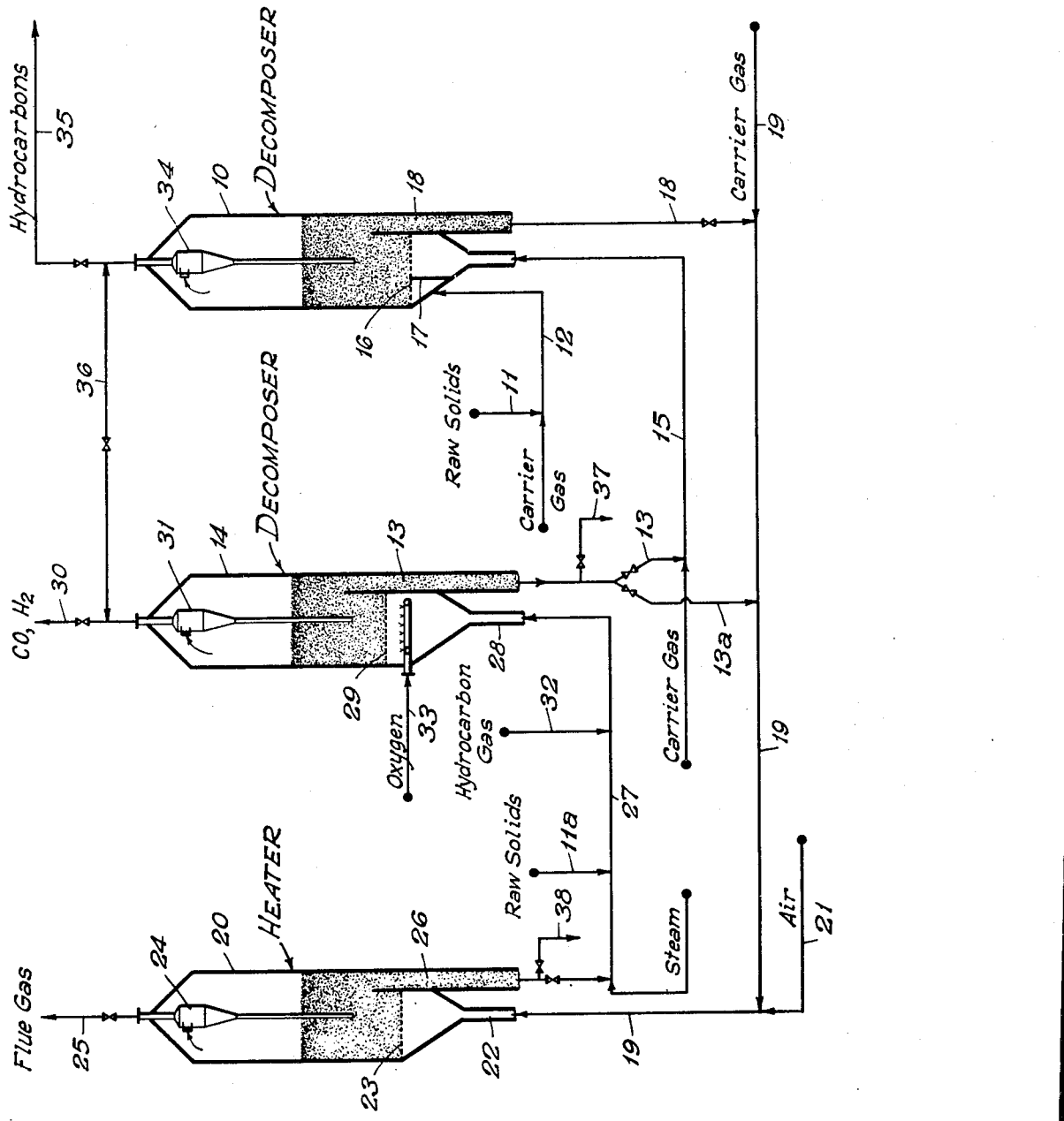
Inventor
Everett A. Johnson
By Pike H. Sullivan
Attorney Patented Sept. 20, 1949

2,482,187

UNITED STATES PATENT OFFICE 2,482,187

PROCESS FOR PRODUCING HYDROGEN-CARBON MONOXIDE GAS MIXTURES

Everett A. Johnson, Park Ridge, Ill., assignor to Standard Oil Company, Chicago, Ill., a corporation of Indiana Application April 3, 1944, Serial No. 529,268

1 Claim. (Cl. 48—196)

This invention relates to a process and apparatus for the optimum utilization of the hydrocarbon values derived from solid carbonaceous substances such as coal, shale, lignite, peat, oil sands, and the like. It relates to the recovery of hydrocarbon values both as liquefiable hydrocarbons and as gases including carbon decomposition products. More particularly, the invention pertains to the production of gas mixtures comprising essentially hydrogen and carbon oxides suitable for the synthesis of hydrocarbons in the presence of catalysts. Insofar as the process involves handling of fluidized solids, this application is a continuation-in-part of my prior copending applications Serial Nos. 392,846 and 392,847 filed May 10, 1941.

It is an object of this invention to provide improved method and means for producing mixtures of hydrogen and carbon oxides from finely divided solid carbonaceous materials in an efficient and expeditious manner. It is a further object to provide a simple apparatus using a minimum of moving parts and critical materials. Another object of my invention is to provide an improved process wherein the heat required to effect the decomposition of the charge is supplied directly by the burning of the solid material in a separate zone. A further and more specific object of my invention is to provide method and means for decomposing powdered coal wherein hot powdered coke is recycled from a separate combustion zone to decomposing zone to supply heat for the rapid decomposition of powdered coal and for the endothermic steam reactions to produce gas mixtures of hydrogen and carbon oxides.

A particular object of my invention is to provide a method and means for recovering hydrocarbon values of finely divided solid materials while maintaining the solid materials within a decomposition or recovery zone in a dense turbulent suspended phase. It is an important object of my invention to provide an improved method whereby powdered coal can be converted into coke and valuable by-products at high temperature within the necessity of transferring heat through metal walls, or without diluting the conversion products with gases resulting from the heating step. Therefore, it is a further object of this invention to provide a process and apparatus for effecting the production of gas mixtures by the decomposition of powdered coal wherein the heat supplied to an endothermic producing zone is generated by the burning of a portion of the powdered coke in a separate zone and the rapid heating of the powdered coal is effected by introducing the powdered coal into a dense turbulent fluent mass of hot coke particles.

Other objects and advantages of my invention will become apparent as the description thereof proceeds in conjunction with the accompanying drawings which illustrate certain embodiments thereof.

Briefly stated my invention contemplates heating a fluent mass of finely divided carbonaceous solids in one zone by the exothermic conversion of carbon with oxygen-containing gas to carbon oxides and transferring the unconverted incandescent solids remaining to a reaction or decomposing zone wherein the solids serve both to supply heat and reactant material for endothermic decompositions of steam. Methane, however, can be fed to the system as the primary carbon source, the circulated solids functioning primarily as a heat carrier. Thus in this zone steam may be reacted with carbon in the form of coke or methane. Particularly when methane and steam are the primary reactants, all or part of the coke can be promoted by depositing a suitable catalytic material thereon; for example, alkali carbonates and mixtures containing alkali carbonates.

Solids are continuously transferred from the reaction or decomposing zone to the exothermic heating zone or to a subsequent decomposing zone into which the raw carbonaceous solids ordinarily will be introduced. The temperature of the contacting will affect the product distribution and in general lower temperatures permit the recovery of more hydrocarbons from raw solids. If desired, oxygen can be supplied to the steam reaction zone for the exothermic oxidation of methane in the presence of the solids to produce one mol of carbon monoxide for every two mols of hydrogen simultaneously with the endothermic oxidation of carbon or methane by steam. The exothermic oxidation of methane or the direct oxidation of carbon solids can be used to control the ratio of hydrogen to carbon oxide in the product gases and, to some extent, the heat balance in the system.

Referring to the drawing in general, the finely divided coal, shale, oil sand, or the like or mixtures thereof is dispersed in a gaseous medium in the system by any one of a number of well known methods. The gaseous medium preferably is an inert gas at the prevailing temperature and may be steam, light hydrocarbons and the like. In one such method the raw material is discharged into a bin or receiver at the top of a standpipe. The head of fluidized material within the standpipe is used to introduce the particles in the system.

The top of the standpipe can be provided with a suitable cyclone and enlarged hopper to effect the separation of the powdered raw material from the carrier medium. The powdered raw material maintained in the standpipe can be aerated by the injection of an aerating fluid near its base. The powdered raw material is passed through a metering valve near the base of the standpipe and is picked up by a stream of gas. Other means such as lock hoppers, star feeders and the like can be used for introducing the finely divided material into any of the several zones.

Whatever the means of dispersion, the raw particles are introduced into an enlarged contacting chamber wherein the recovery of the hydrocarbon values is effected by distillation and/or decomposition. This reaction or coker chamber is of such size and shape as to maintain the material rich in hydrocarbons and the hot residual material in a turbulent dense fluent phase therein. The inert gaseous material introduced into the recovery zone with, or in addition to, the raw material passes upwardly through the residual material at such a velocity as to maintain a turbulent dense suspended solids phase. Other vapors or reactant gases likewise can be passed upwardly therethrough which supplement the carrier medium in maintaining the dense turbulent phase. The vessel is designed so as to give the time of contact necessary to recover the hydrocarbons and to permit the continuous withdrawal of a mixture of denuded and residual matter from a low point in the dense phase.

The powdered coal, shale, or the like, introduced into my system is referred to herein as being the "raw" material. The solids from which substantially all the volatilizable hydrocarbon values have been recovered are referred to as being "denuded" solids. The solids which are recycled from the heating zone are referred to as being the "residual" material whether it comprises carbon or not. The denuded material (in the case of coal it is coke) is burned with an oxygen-containing gas while mixed with recycled residual material to produce the hot residual material. It is apparent that the material withdrawn from the reaction zone will include both the recently denuded and the recycled residual material and that all three raw, denuded, and residual will probably be introduced into each of the zones to some extent. In fact to maintain heat balance it may be desirable to introduce a portion of the raw solids into the heating zone directly.

Seventy to ninety per cent of conventional powdered coal passes a 200 mesh screen. When using conventional powdered coal as the charge to my process, I prefer to employ gas velocities in the contacting zones of between about 0.5 and about 3 feet per second. For example, between about 1 to 2 feet per second. The raw coal should be maintained within the recovery zone for a time sufficient to effect the volatilization of the hydrocarbons and this normally takes place in less than about one minute. A uniform temperature prevails throughout the decomposition zone by virtue of the dense turbulent fluent phase and may be maintained between about 1000 and about 1500° F. or higher, for example, at about 1800° F. The high temperature is maintained in the decomposition zone by recycling a high ratio of residual material to raw material. The temperature difference between the zones will determine the recycle ratio for a given raw material feed rate and this ratio should be between about one and 100 to one. For example, in the case of coal, ratios of between about 10 and 50, and in the case of shale or sand between about 5 and 10 to one can be used. With the temperature of the decomposing and coking zones determined, the heater zone may then be operated at the required temperature to balance the system. Other variables which influence the optimum recycle ratio of the residual material are the composition of the raw hydrocarbon-containing substance, the sensible heat of the recycled residual substance, the desired residence time within the decomposition zone and the like. In any event, the ratio of the residual substance to the raw material is at least sufficient to volatilize the hydrocarbons and where desired is sufficient to supply the heat of conversion of the volatilized material to produce optimum amounts of the desired product. The recycle rate between the heating and endothermic steam decomposing zone will be sufficient to supply the necessary heat.

At a temperature between about 900 or 1000° F. and about 1500° F. or higher the predominant effect is the recovery of hydrocarbons from the raw solids. A nonoxidizing or inert gas such as light hydrocarbons can be used to maintain the solids in a dense turbulent suspended phase. When steam is present, and particularly at the higher temperatures, carbon and steam readily react to form hydrogen and carbon oxides. Thus the temperatures in the reaction zone may be such that steam is substantially completely converted at the desired rate into hydrogen and carbon monoxide. The use of smaller amounts of steam results in increased decomposition of methane to yield a gas of higher hydrogen content. Since this reaction and distillation or coking of the raw solids are both endothermic, heat must be supplied. This is accomplished primarily by cycling incandescent coke particles or solids from a burning or heating zone to the endothermic contacting zone. If the amount of heat absorbed exceeds that required for balancing the heat losses, the deficiency may be made up by effecting an exothermic reaction in the reaction zone, such as the oxidation of methane with oxygen. A methane bearing gas can be introduced into the incandescent coke bed, for example, along with the steam. Oxygen for methane oxidation can be simultaneously introduced separately. When the gases converted contain heavy hydrocarbons of greater carbon content than methane there may be a deposition of carbon upon the incandescent solids. Such deposition also may occur when the raw solids, containing volatile hydrocarbon, is supplied to the system by way of the reaction chamber.

When methane and oxygen are both added to one of the contacting zones, the methane may be directly oxidized at temperatures above about 1750° F. to produce two volumes of hydrogen for each volume of carbon monoxide. This is an exothermic reaction. When steam is present there will result oxidation of methane with steam to produce three volumes of hydrogen and one volume of carbon monoxide at temperatures above about 2000° F. This is an endothermic reaction. Steam and coke are converted directly into a 1:1 mixture of hydrogen and carbon monoxide by an endothermic reaction. These reactions can be conducted simultaneously within the same or separate zones and by controlling the relative amount of reactants which is converted by the respective methods, the proportion of hydrogen and carbon monoxide in the net mixture can be controlled. If desired, the gasous product mixture can be subjected to a catalytic contacting, as, for example, for converting additional amounts of carbon monoxide into carbon dioxide which is subsequently removed to increase the hydrogen-carbon monoxide ratio.

The density of the carbonaceous solids will vary greatly from porous coke on the one hand and sands or shale residue on the other. With aeration, i. e. with gas or vapor velocities of between about 0.05 and about 5.0 feet per second, the bulk density of dense phase solids will be in the order of magnitude of between about 25% and about 90% the density of the finely divided material when measured in a settled condition. With the vapor velocities of between about 1 and 3 feet per second the particles are maintained in the dense turbulent suspended phase and the bulk density of the dense turbulent suspended phase will ordinarily be between about 30 and about 50 of the apparent density of the settled material. With higher gas velocities, i. e. the velocity existing in transfer lines, the particles are in a dilute dispersed phase. The light dispersed phase in the upper part of the decomposing and heating zones is not more than 30% and is usually less than about 10% of the bulk density of the dense turbulent fluent phase maintained within the lower part of the decomposition or heating zones.

In most cases the bulk of the solids separate from the gases in the upper portion of the contacting zones. The separate material is accumulated in a dense turbulent suspended phase and transferred therefrom over a weir or through one or more overflow pipes or standpipes. Where the transfer is completely in the dense phase it may be in either direction. The dense phase also prevents the uncontrolled flow of gases from one zone to another. Denuded and residual particles may be further separated from the gases leaving the decomposing or heating zones by centrifugal separators or other means.

The separation zone at the top of the decomposition zone and/or the cyclone separator equipment is adequate to remove substantially all of the denuded and residual particles from the product gas stream leaving the decomposition zones. These gases may be passed through one or more waste heat boilers, coolers and the like, to reduce the gases to the proper temperature for absorption and then passed to an absorber where they are contacted with an absorber oil to separate any liquefiable constituents from the gases. An intermediate solids and tar separator may be interposed before the absorber. The unabsorbed gases removed overhead comprise essentially hydrogen and carbon monoxide suitable for hydrocarbon synthesis. When coke or methane is reacted with steam in the absence of raw solids, the product consists essentially of hydrogen and carbon oxides and can be used directly as feed to a hydrocarbon synthesis system.

Lignite is a particularly useful material for my process. It exists in either surface or lightly covered deposits and can be mined economically on a large scale. It has much of the appearance of coal ranging from black to brown in color and is of relatively low sulfur content, in some cases there being no detectable sulfur in the gaseous products. The main differences between lignite and coal are that it contains between 35 and 45% moisture and on a dry basis has a lower B. t. u. value per pound.

Lignite is very reactive with water vapor at temperatures between about 1000 and 2200° F. and by controlling the temperature, the composition of the gas can readily be varied from about 45% hydrogen and 45% CO to about 60% hydrogen, 10% CO and 30% $CO_2$. A methane-containing gas fraction can be burned with oxygen or air to effect heat balance in the system and to produce additional hydrogen and carbon monoxide. A ton of coke produced from lignite produces about 200,000 cubic feet of gas.

The lignite with its 35 to 45% moisture content can be supplied to the producer or coking zones wherein a fluent bed of incandescent or hot coke is maintained. The water content of the lignite provides water vapor which reacts with the lignite coke to produce hydrogen and carbon monoxide. A portion of the coke can be continuously withdrawn to a burning zone wherein a portion of the coke is consumed by burning in air to produce additional incandescent coke for recycle to the reaction or distillation zones.

Another source of raw carbonaceous solids for my process is oil impregnated sands, for example, of the type to be found in the Athabaska region of Alberta Province, Canada. The deposits can be described as an impregnation of beds of sand and clayey material by a heavy oil. The bituminous sand is a compact material, but if lumps are removed from the bed they are found to yield to pressure and break into a great number of smaller particles. The individual grains of sand and clay range between about 30 and about 200 mesh and particles of this size are effectively treated in fluid systems of the type described in connection with this invention. The oil does not appear to be a pore-space filling, but resembles a film or envelope around the individual grains of sand in concentrations ranging as high as about 25%.

Sands having at least about 9.5% oil are particularly useful in fluid coking since the heat for the recovery of the hydrocarbon content can be supplied by burning the coke remaining on the sand in a separate zone and contacting the raw sand with the hot residual sand in a dense turbulent phase. About 25% based on the crude oil is converted into coke which is consumed in the separate heating step. Other means which have been employed in recovering the hydrocarbon content from this type of sand include washing or contacting with steam. If the consumption of the residual coke is undesirable, it is contemplated that the two methods may be combined wherein heat can be recovered from the spent sands to supply steam for the washing technique. Thus part of the oil can be recovered by the hot fluid solids technique and part by washing. The heat recovery from the hot residual sand may be effected by waste heat boilers or by directly contacting with water.

Temperatures between 1800 and 2500° F. are readily attainable by burning powdered coke or coked solids in a heater, and the temperature can be controlled by the amount of oxygen made available to the heater. If the solids being processed do not contain enough carbonaceous material to supply both fuel and reactant material (as may be the case with some low grade sands or shale) fuel gas or methane, a portion of the raw solids, or the like can be supplied to heater 20 directly to maintain the system in heat balance.

In the embodiment described, the temperature of the hot solids and the recycle rate of the hot solids between the heater and the contacting zones are controlled to maintain a temperature between 1000 and 1500° F., and higher, within the coke zone, and above about 1500° F. in the generator. The inert gases, such as tail gas recycled from the coking-recovery system, can be used to maintain the dense turbulent solid phase in the decomposition zone. Conversion products comprising liquefiable hydrocarbons and methane are obtained from the coker. When operating under these conditions in the presence of steam, carbon oxides and hydrogen are also formed. As the temperature is increased in the presence of steam, the yield of hydrocarbons progressively decreases and the yield of carbon oxides and hydrogen increases. Within the temperature range described, the ratio of carbon monoxide to carbon dioxide increases with increased temperature, and at 2000°, or thereabouts, the carbon oxides formed are substantially carbon monoxide. In the event that it is desired to produce carbon monoxide-hydrogen mixtures with relatively low concentrations of carbon dioxide and hydrocarbons, the temperature should be in the upper portion of the range described.

When it is desired to recover the liquid hydrocarbons derivable from the carbonaceous solids and also to make high yields of carbon monoxide and hydrogen, I suppose to effect the process in a plurality of stages so as to recover the hydrocarbon values separately; withdrawing from one the hydrocarbon values comprising liquefiable hydrocarbons and from another the hydrocarbon values comprising carbon monoxide and hydrogen. In the hydrocarbon-recovering decomposition zone, an inert gas should be used to maintain the dense turbulent phase, and in the carbon monoxide-hydrogen producing decomposition zone steam is supplied for maintaining the dense turbulent phase and for reaction with carbon as coke or methane to produce carbon monoxide and hydrogen. The hydrocarbon-recovering decomposition zone is preferably operated in the lower portion of the temperature range described, for example, in the range of 1000 to 1500° F. while the decomposition zone used to produce carbon monoxide and hydrogen ordinarily will be operated in the higher portion of the range described, namely above about 1500° F. for example 2000° F. or higher. The optimum combination of temperatures for these zones will depend upon the nature of the carbonaceous solids charged to my process, the amount of steam and methane introduced, and upon the relative value of the two primary product streams. The conversion zones will normally be endothermic, and the heat for carrying out these reactions will be supplied as sensible heat in the solids supplied from the heater. The relative ratio of oxidizing fluids supplied and carbon consumed as methane or coke in the decomposing zone will affect the ratio of carbon monoxide and hydrogen produced and may be varied to give the ratio required for synthesis of hydrocarbons. Hydrocarbons produced by the catalytic reduction of carbon oxide or a fraction of the product can be contacted with hot coke to effect the conversion thereof into aromatics. This aromatic producing zone can be supplied with hot coke from the coke heater or decomposer zones. Hydrocarbons recovered from the solids can be combined in the synthesis product, before or after the aromatization treatment.

The drawing illustrates by diagram an embodiment of my invention wherein the coke is handled in three contacting zones including a heating zone and two decomposing or conversion zones preferably maintained at different temperature levels. Powdered coal, coke, lignite, peat, oil sands, or the like is supplied to the decomposer or coker 40 by any suitable means including direct injection into the dense turbulent phase within the coking zone or by a carrier gas as illustrated. The finely divided raw solids are introduced for example by lines 11 or 11a which may comprise a standpipe and metering value, lock hopper or the like. If a standpipe is used, the substance to be treated is discharged into a combined separator-hopper at the top of a standpipe. The solids in this standpipe are maintained in an aerated condition by the injection of an aerating fluid, such as steam, near the bottom of the standpipe. The solids pass downwardly through the standpipe and through a metering valve into the carrier gas. The finely divided solids are picked up in a carrier gas in line 12 and introduced into coker 10. A quantity of powdered incandescent solids is withdrawn by line 13 from the decomposer or generator 14 and dispersed in a carrier gas in line 15. To obtain the maximum recovery of hydrocarbon values as liquefiable hydrocarbons, the carrier gas should be inert or substantially unreactive with the solids. Streams of hot solids and raw solids separately dispersed are introduced into the recovery chamber or decomposer 10 through partition 16 into a dense turbulent suspended solids phase within the coking zone 10. The partition 16 comprises a screen, perforated plate, grid or the like. The baffle 17 can be provided to void commingling raw solids with the hot solids except in the dense turbulent suspended phase proper of the contacting zone 10. The chamber 19 is of such size and shape as to permit a major amount of finely divided solids to accumulate therein in the dense turbulent solids phase above partition 16. Upward gas velocity of the order of between about 1 and 3 feet, for example, 2 feet per second, can be used to maintain the dense turbulent solids phase. Higher velocities in the case of larger particles and/or greater density are contemplated.

Hydrocarbon values evolved from the solids are continuously separated from the solids within chamber 10. Cyclone separator 34 can be provided to remove residual solids from the gases and vapors which are removed by line 35. The coked solids are withdrawn downwardly from the coker zone 10 by standpipe 18 and a valve can be provided in this line to control the flow of the powdered solids into the transfer line 19. A suitable carrier gas in line 19 may comprise the flue gases from the heating zone 20. The carrier gas supplied to transfer lines 12 and 15 is an inert gas such as tail gas from the recovery system of the decomposer 10. In some cases steam can be used.

Oxygen-containing gas, which can be air, is introduced by line 21 into line 19 and the combined stream introduced into the heating chamber 20 by conduit 22 through partition 23, similar to partition 16, above which a dense turbulent suspended phase is maintained. Within the heating zone 20 the carbonaceous material is burned at a temperature of between about 1800 and about 2500° F. The bulk of the incandescent solids is continuously separated from flue gases within the upper part of the chamber 20. the gases being removed overhead by conduit 25 and being sent to the stacks or used as a carrier gas as described hereinabove. One or more stages of cyclone separator 24 may be used. When it is desired to produce coke, the net production of coke may be withdrawn with the flue gases and separated by suitable means outside of the heating zone 18. In that event cyclone separators probably will not be used. A portion of the solids from decomposer 14 can be recycled by lines 13a and 19 to the heater 20.

Incandescent solids are withdrawn from chamber 20 by standpipe 26 and dispersed in a relatively large quantity of steam flowing in line 27 and the mixture is introduced by conduit 28 and dispersed in a dense turbulent suspended phase above screen or partition 29 in the decomposer 14. A preliminary distributor plate usually of lower pressure drop than partition 29 can be provided below distributor ring 33 when the optional distributor 33 is provided. The temperature within the chamber 14 is maintained at between about 1500 and 2000° F. by supplying incandescent solids thereto. At this temperature steam and carbon are decomposed into a mixture of carbon monoxide and hydrogen which is continuously withdrawn overhead by means of conduit 30. These gases comprise feed suitable for a catalytic reduction of carbon monoxide for the synthesis of hydrocarbons which can be effected in a fluidized catalyst zone. Line 36 may be provided for combining the effluents from 14 and 10 for further processing jointly. Solids continuously separate from the gases in the solids disengaging space in the upper part of chamber 14 and cyclone 31 can be provided to remove residual solids from the gases in the solids disengaging space in the upper part of chamber 14 and cyclone 31 can be provided to remove residual solids from the gases. The reaction is endothermic and the cooled solids are withdrawn from the dense turbulent phase by conduit 13 and transferred by line 15 into the coker 10 as described above wherein the residual sensible heat is used to effect the recovery of volatiles from the solids which comprise the raw solids feed to the system. Methane or natural gas can be supplied to the generator 14, for example by line 32, wherein methane-steam and carbon-steam react to produce additional amounts of hydrogen and carbon oxide. Carbonaceous solids can be introduced by line 11a particularly when it is desired to add reactant carbon to decomposer 14. It is also contemplated that oxygen can be introduced into the generator 14, for example by line 33 to react with hydrocarbons and/or carbon. Thus methane-stem, oxygen-carbon, oxygen-methane and water-carbon reactions cooperate to maintain the desired temperature level and the desired hydrogen to carbon monoxide ratios. Methane-steam-carbon dioxide reaction also is contemplated.

A plurality of cyclone separators 34 can be provided within the coker 10 and the separated coke returned to the dense turbulent powdered coke phase. The coker gases and cracked products are withdrawn from the decomposition chamber 10 by conduit 35 and may be quenched by the introduction of suitable quenching medium, such as water or tar oils. The quenched product stream then can be introduced into a separator, the gaseous products withdrawn from the separator, cooled by passing through cooler and introduced into a suitable absorber. An aromatic fraction produced by the process can be used as the absorber oil. The liquid hydrocarbon product is withdrawn from the separator and passed to suitable distillation and fractionating equipment for recovery of the various fractions. When phenols are present the separated liquid may include emulsions with water. The removal of a 5% bottoms by distillation will facilitate a subsequent water separation. A slurry of coke particles and tar can be removed from the bottom of the separator and can be recycled to the coker 10. If desired, the separator can be operated to remove water and coke in which case a slurry of coke and water can be withdrawn and passed to a suitable coke settler.

The effluent from the generator 14 may be recovered separately by line 30 or it may be combined by line 36 with the effluent from the coking zone 10 in line 35 and processed therewith. Cyclone separators are illustrated within each of the contacting chambers for returning the separated solids to the dense turbulent solids phase within each zone. These solids can be recovered from one zone and introduced into another. The separators in one or more zones can, however, be omitted entirely.

The net production of coke, ash, or denuded sand can be withdrawn from the system by lines 37 or 38. However, since this material will be at a relatively high temperature level, it may be contacted with additional quantities of steam or water to abstract heat directly and the effluent from the contacting supplied either to the generator zone 14 or to the coking zone 10.

The invention has been described with particular reference to a three zone system, but it is contemplated that two zones including a heater can be used. The solids can be circulated between the heater 20 and generator 14, the coker 10 being by-passed except to furnish the heat necessary to coke make-up solids. Also the generator 14 may function as a coker when raw solids are supplied thereto and coker 10 omitted from the system. This latter operation is particularly useful when the coke is used primarily as a heat carrier and the steam-methane reaction produces the hydrogen and carbon oxides. Additional fluidized coke zones can be provided for example for the purpose of depositing activators on the coke, aromatizing hydrocarbon fractions, producing steam, preheating carrier gas, and the like.

It is apparent from the above description that I have attained the objects of my invention in providing the novel process and apparatus for the recovery of hydrocarbon values from naturally occurring carbonaceous materials as hydrocarbons or as a mixture of hydrogen and carbon monoxide. Other modifications of my method and apparatus described herein can be made by those skilled in the art without departing from the spirit of my invention. Therefore, although I have described particular embodiments of my invention in more or less detail, it is to be understood that the invention is not limited thereto but is defined by the appended claim.

I claim:

The method of making gas mixtures consisting chiefly of hydrogen and carbon monoxide suitable for the synthesis of hydrocarbons in the presence of a synthesis catalyst which method comprises introducing finely divided carbonaceous solids into a combustion zone, heating a fluent mass of said finely divided carbonaceous solids to incandescence by passing a gas comprising oxygen upwardly therethrough at a velocity sufficient to maintain the solids as a suspended dense turbulent phase superimposed by a light dispersed solids phase in said combustion zone, separating solids from gaseous combustion products in the upper part of said combustion zone and removing said combustion products at the upper part of said zone, separately removing incandescent solids comprising carbon in dense phase fluidized condition at a point below the dense phase level in the combustion zone and introducing said removed solids into a decomposing zone, passing a conversion gas consisting essentially of oxygen, steam and methane upwardly in the decomposing zone at a rate sufficient to maintain a suspended dense turbulent solids phase therein superimposed by a dilute solids phase, maintaining said decomposing zone at a temperature upwards of 1500° F. whereby at least a portion of said carbon, methane, oxygen and steam react to form a hydrogen-carbon monoxide mixture for hydrocarbon synthesis, separating product gas from solids in the upper part of said decomposing zone and withdrawing the product gases from the upper part of said zone, separately withdrawing hot solids in dense phase fluidized condition from a point below the level of the dense phase in the decomposing zone and returning at least a part of the withdrawn hot solids to the dense solids phase in the combustion zone.

EVERETT A. JOHNSON.

REFERENCES CITED

The following references are of record in the file of this patent:

UNITED STATES PATENTS

| Number | Name | Date |
| --- | --- | --- |
| Re. 18,382 | Odell | Mar. 8, 1932 |
| 1,687,118 | Winkler | Oct. 9, 1928 |
| 1,840,649 | Winkler | Jan. 12, 1932 |
| 1,984,380 | Odell | Dec. 18, 1934 |
| 2,052,149 | Odell | Aug. 25, 1936 |
| 2,327,175 | Conn | Aug. 17, 1943 |
| 2,358,888 | Thomas | Sept. 26, 1944 |
| 2,377,078 | Gerhold | May 29, 1945 |
| 2,387,309 | Sweeney | Oct. 23, 1945 |

FOREIGN PATENTS

| Number | Country | Date |
| --- | --- | --- |
| 564,870 | Germany | Nov. 24, 1932 |
| 632,466 | France | Oct. 10, 1927 |